(12) United States Patent
German et al.

(10) Patent No.: US 8,130,471 B1
(45) Date of Patent: Mar. 6, 2012

(54) TRACES WITH REDUCED WIDTH PORTIONS FOR DISK DRIVE HEAD SUSPENSIONS

(75) Inventors: Nole D. German, Hutchinson, MN (US); Michael E. Roen, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 481 days.

(21) Appl. No.: 12/358,003

(22) Filed: Jan. 22, 2009

Related U.S. Application Data (60) Provisional application No. 61/063,337, filed on Feb. 1, 2008.

(51) Int. Cl.
*G09B 5/147* (2006.01)

(52) U.S. Cl. .................. 360/245.9; 360/244.9; 360/246; 170/250; 170/268

(58) Field of Classification Search .......................... None
See application file for complete search history.

(56) References Cited

U.S. PATENT DOCUMENTS

| | | | |
|---|---|---|---|
| 5,608,591 A * | 3/1997 | Klaassen .................... | 360/245.9 |
| 5,631,786 A | 5/1997 | Erpelding | |
| 5,717,547 A | 2/1998 | Young | |
| 5,737,152 A | 4/1998 | Balakrishnan | |
| 5,995,328 A | 11/1999 | Balakrishnan | |
| 6,038,102 A | 3/2000 | Balakrishnan et al. | |
| 6,275,358 B1 | 8/2001 | Balakrishnan et al. | |
| 6,624,729 B2 | 9/2003 | Wright et al. | |
| 6,762,913 B1 * | 7/2004 | Even et al. .................... | 360/246 |
| 6,839,204 B2 | 1/2005 | Shiraishi et al. | |
| 6,975,488 B1 | 12/2005 | Kulangara et al. | |
| 2005/0280944 A1 | 12/2005 | Yang et al. | |
| 2006/0134852 A1 | 6/2006 | Jang | |

FOREIGN PATENT DOCUMENTS

JP    2000-113438    4/2000

* cited by examiner

*Primary Examiner* — Hoai V Ho
*Assistant Examiner* — James G Norman
(74) *Attorney, Agent, or Firm* — Faegre Baker Daniels LLP

(57) ABSTRACT

An integrated lead flexure includes traces with windowed or reduced width portions. The flexure includes a metal base layer with a plurality of apertures, an insulating layer on the metal base layer, and one or more conductive traces formed on the insulating layer and extending over the metal base layer and the plurality of apertures. Backed portions of the one or more conductive traces that extend over the metal base layer have a first width, and unbacked portions of the one or more conductive traces that extend over the plurality of apertures have a second width that is less than the first width.

26 Claims, 6 Drawing Sheets

TRACES WITH REDUCED WIDTH PORTIONS FOR DISK DRIVE HEAD SUSPENSIONS

CROSS-REFERENCE TO RELATED APPLICATION

This application claims the benefit of provisional application Ser. No. 61/063,337, filed Feb. 1, 2008, entitled "WINDOWED TRACES FOR DISK DRIVE HEAD SUSPENSIONS," which is hereby incorporated by reference in its entirety.

TECHNICAL FIELD

The present invention relates generally to a head suspension of the type used in a magnetic disk drive or other dynamic data storage system. More particularly, the present invention, relates to traces with reduced width portions on an integrated lead suspension.

BACKGROUND

Disk drive head suspensions with wireless or integrated lead flexures are generally known and disclosed, for example, in the following U.S. Patents and U.S. Patent Application Publications, all of which are incorporated herein by reference.

| Inventor Name | Pat./Publication No. |
| --- | --- |
| Klaassen | 5,608,591 |
| Erpelding | 5,631,786 |
| Young | 5,717,547 |
| Balakrishnan | 5,737,152 |
| Balakrishnan | 5,995,328 |
| Balakrishnan et al. | 6,038,102 |
| Balakrishnan et al. | 6,275,358 |
| Shiraishi et al. | 6,839,204 |
| Kulangara et al. | 6,975,488 |
| Yang et al. | 2005/0280944 |

The continuing development of read/write head and related disk drive technology requires improved integrated lead flexures having enhanced electrical performance capabilities. To be commercially viable, the suspensions and flexures must be capable of being efficiently manufactured.

SUMMARY

The present invention relates to an integrated lead flexure having traces with windowed or reduced width portions. The flexure includes a metal base layer with a plurality of apertures, an insulating layer on the metal base layer, and one or more conductive traces formed on the insulating layer and extending over the metal base layer and the plurality of apertures. Backed portions of the one or more conductive traces that extend over the metal base layer have a first width, and unbacked portions of the one or more conductive traces that extend over the plurality of apertures have a second width that is less than the first width.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Figure 1:
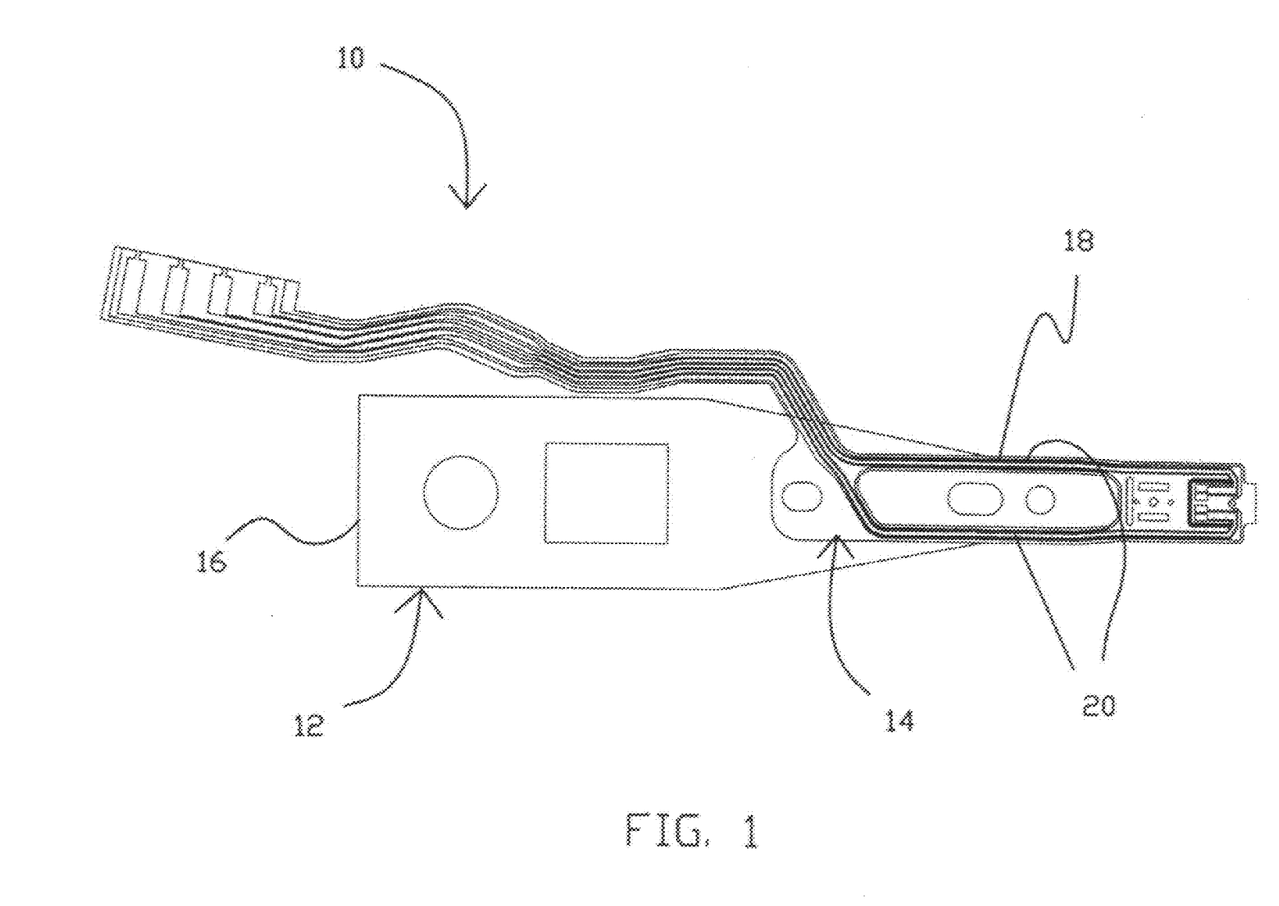
FIG. 1 is a plan view of a disk drive head suspension assembly including a load beam and an integrated flexure according to embodiments of the present invention.

FIG. 1 is plan view of a disk drive head suspension assembly 10 including a load beam 12 and a flexure 14. The load beam 12 includes a proximal actuator arm base region 16 configured for mounting the head suspension assembly 10 to an actuator arm (not shown), and a distal end region 18 to which the flexure 14 is attached. The flexure 14 is configured to support a magnetic head slider (not shown), and includes a plurality of conductive traces 20 (also known as leads) electrically coupling the head slider to other electronic circuitry of the disk drive.

Figure 2:
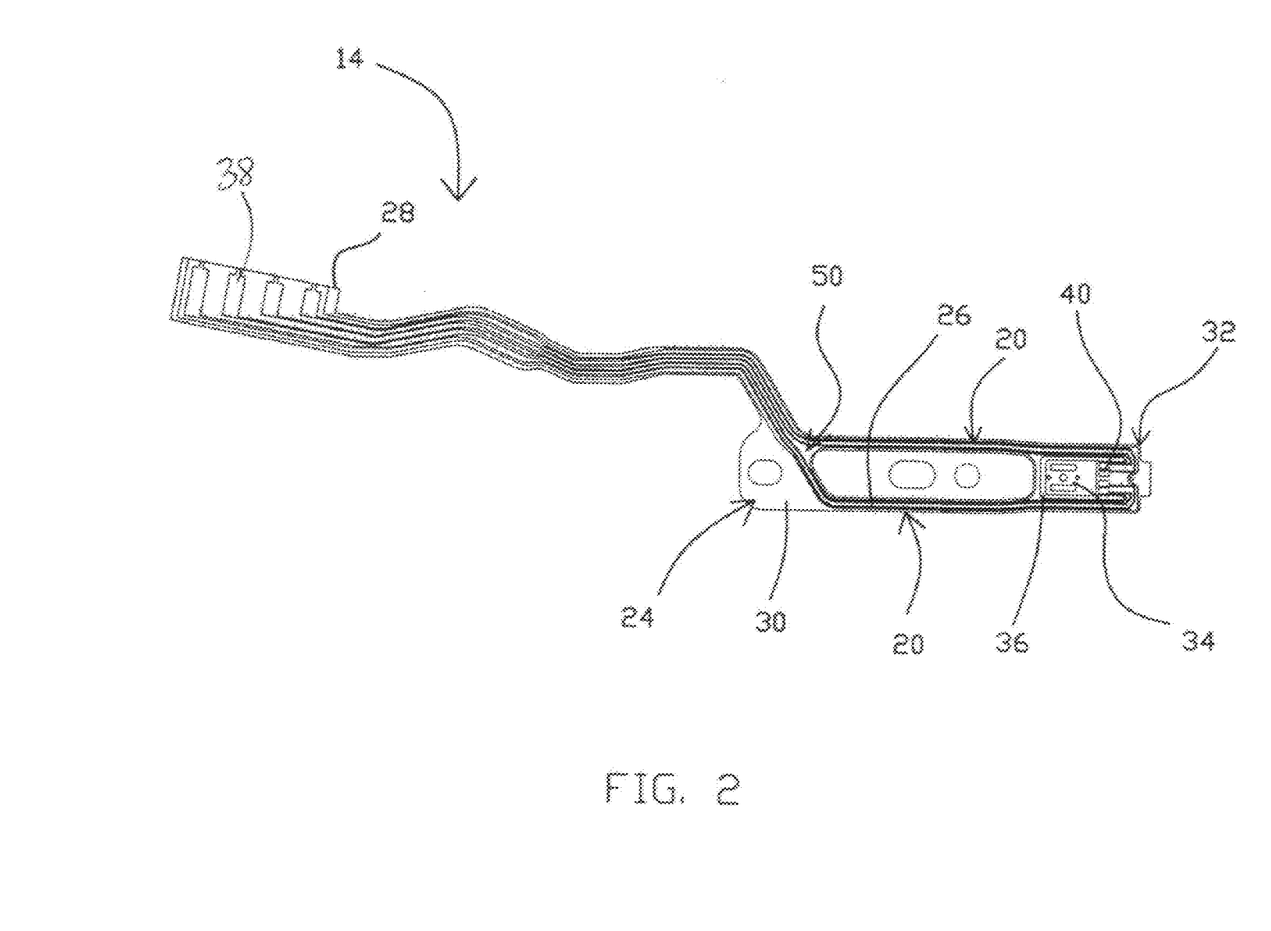
FIG. 2 is a plan view of the flexure of the head suspension assembly of FIG. 1.

FIG. 2 is a plan view of the flexure 14 separate from the load beam 12. The flexure 14 includes a generally flat spring metal layer 24 having a major surface 26, a proximal tail region 28, a base region 30, and a distal gimbal region 32. The gimbal region 32 includes a tongue 34 defined by a channel 36 formed through the spring metal layer 24. The tongue 34 operates to support the magnetic head slider (not shown) as is known in the art, and is designed to be resiliently moveable with respect to the remainder of the flexure 14 in response to aerodynamic forces exerted on the head slider during operation of the disk drive. The base region 30 is adapted to engage with the load beam 12, and may include various tabs, apertures, and offsets (not shown) to facilitate attachment with the load beam (typically by welding). The spring metal layer 24 can assume a variety of shapes and sizes without departing from the scope of the invention.

The flexure 14 is an integrated lead or wireless structure, with the conductive traces 20 extending from the gimbal region 32 to the tail region 28 of the flexure 14. The flexure 14 may be manufactured by known additive or subtractive manufacturing processes. The conductive traces 20 operate to electrically couple the magnetic head (not shown) and external circuitry (not shown) attached to the conductive traces 20 in the tail region 28 of the flexure 14. In the illustrated embodiment, each of the conductive traces 20 includes a terminal bonding pad portion 38 in the tail region 28 and a head bonding pad portion 40 in the distal gimbal region 32 adjacent the tongue 34. The magnetic head may be attached to the tongue 34, e.g., using an adhesive. The terminal bonding pad portion 38 and head bonding pad portion 40 of each respective trace 20 may be electrically connected, e.g., by soldering, to a terminal pad on the external circuitry and magnetic head, respectively.

The flexure 10 also includes a dielectric layer 50 between the traces 20 and the spring metal layer 24. The dielectric layer 50 operates to support the traces 20 and to electrically isolate the spring metal layer 24 from the traces 20.

The traces 20, the spring metal layer 24, and the dielectric layer 50 can be made from any materials known in the art or later developed for comparable structures in head suspension flexures. In one embodiment, the spring metal layer 24 is comprised substantially of stainless steel. In various embodiments, the material making up the dielectric layer 50 is selected based on the design and functional requirements of the flexure 14 and the particular process used to form the dielectric layer 50. In one embodiment, the dielectric layer 50 is comprised of a dielectric polymer. For example, the dielectric layer 50 may be comprised of polyimide.

The conductive traces 20 may be comprised of copper or copper alloys. In other embodiments, all or portions of the conductive leads are comprised of noble metals such as gold or silver. For example, the conductive traces 20 may be formed from a copper or copper alloy, and plated with a non-corrosive conductive material such as gold or silver. In still other embodiments, the traces 20 have multilayer structures including layers of different conductive materials. For example, the flexure 14 may include stacked leads with layers of dielectric material disposed between adjacent lead layers. In some embodiments, the flexure 14 may include one or more conductive ground plane layers (not shown in FIGS. 1 and 2) disposed between the spring metal layer 24 and the traces 20, and optionally separated from the spring metal layer 24 by a dielectric layer. Still other materials and flexure lead and dielectric layer configurations will be apparent to those skilled in the art.

The following figures illustrate a portion of the flexure 14 including conductive traces 20 configured in accordance with embodiments of the present invention. The portion of the flexure 14 shown in each embodiment may be any portion along the length of the flexure 14. In each embodiment, the spring metal layer 24 includes a plurality of apertures, and the traces 20 are formed over the spring metal layer 24 and extend over or bridge the apertures. The apertures affect the impedance of the traces 20. The size, shape, number, and configuration of the apertures shown in the following figures can be varied to control the impedance of the traces 20, such as to match the impedance to the loads connected to the traces 20.

In accordance with the present invention, the portions of the traces 20 that extend over the apertures have a reduced width (along a dimension perpendicular to the major dimension of the flexure 14) compared with portions of the traces 20 that do not extend over the apertures. The decreased amount of material used in the reduced width portions decreases the cost to make the traces 20. At the same time, the reduced width portions have minimal effect on the electrical performance characteristics (e.g., bandwidth and impedance) of the traces 20. In each of the following figures, the dielectric layer 50 is omitted for ease of illustration, but it will be appreciated that the dielectric layer 50 may extend over all or portions of the spring metal layer 24 and the apertures.

Figure 3A:
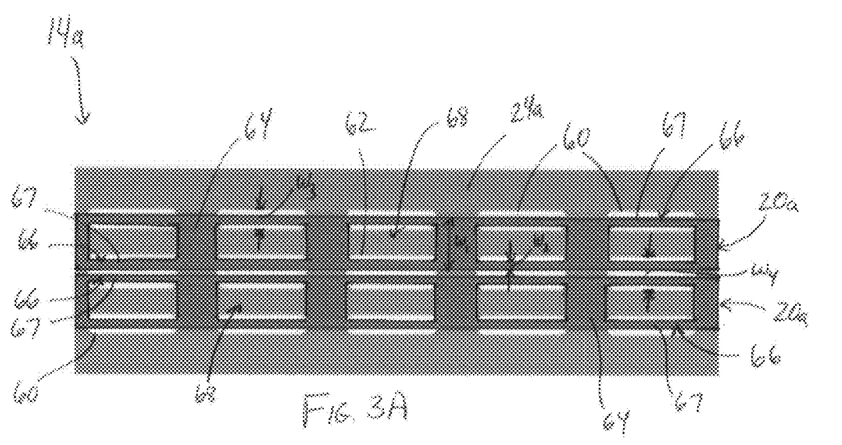
FIG. 3A is a top plan view of a portion of a lead flexure including a metal base layer with apertures extending along narrowed portions of conductive traces, according to an embodiment of the present invention.
Figure 3B:
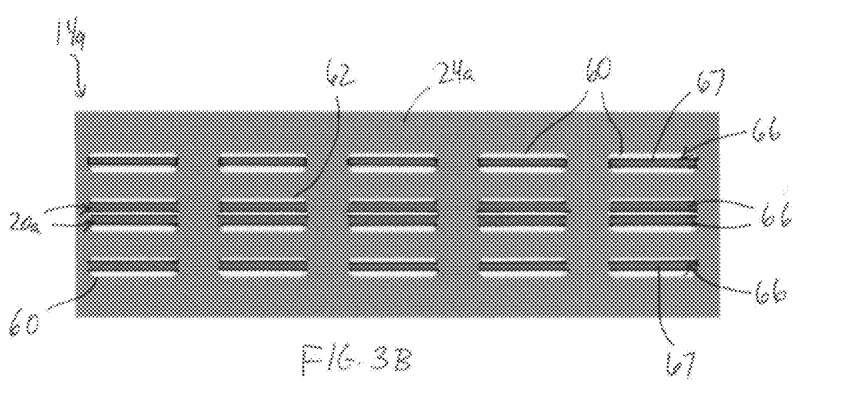
FIG. 3B is a bottom plan view of the portion of the lead flexure shown in FIG. 3A.

FIG. 3A is a top plan view and FIG. 3B is a bottom plan view of a portion of a flexure 14a including a spring metal layer 24a and conductive traces 20a, according to an embodiment of the present invention. The spring metal layer 24a includes outer apertures 60 and inner apertures 62. In the embodiment shown, the apertures 60 and 62 have rounded corners. The conductive traces 20a include backed portions 64 that extend over and are supported by the spring metal layer 24a. The conductive traces 20a also include unbacked portions 66 that extend over the apertures 60 and 62 and are unsupported by the spring metal layer 24a. Pitch L1 extends between the end of one backed portion of the conductive trace 20a and the beginning of the next backed portion of the conductive trace 20a. In some embodiments, the pitch L1 is greater than 0.1 mm and less than 1.0 mm. In one exemplary embodiment, the percentage of the leads 20a that comprises the unbacked portions 66 is greater than about 50%. In another exemplary embodiment, the percentage of the leads 20a that comprises the unbacked portions 66 is greater than about 70% of the pitch L1. In a further exemplary embodiment, the percentage of the leads 20a that comprises the unbacked portions 66 is greater than about 90%. The unbacked portions 66 define legs 67 that connect adjacent backed portions 64 at opposite ends of apertures 60 and 62. In the embodiment shown, adjacent backed portions 64 of each conductive lead 20a are connected by two legs 67 that extend from the outer edges or sides of the backed portions 64, which together define windows 68 through the conductive leads 20a. In alternative embodiments, the legs 67 can be at or extend from other parts of the backed portions 64.

The backed portions 64 of the traces 20a have a width $w_1$, and the legs 67 have a width $w_2$, both of which extend perpendicular to the major dimension of the traces 20a. The width $w_2$ of the legs 67 is less than the width $w_1$ of the backed portions 64. In one exemplary embodiment, the width $w_1$ is about 200 μm and the width $w_2$ is about 40 μm. In other embodiments, the widths $w_1$ and/or $w_2$ are greater or lesser. The width $w_2$ is such that the transmission of signals through the unbacked portions 66 is unaffected or minimally affected by transmission losses due to the skin effect.

The outer apertures 60 have a width $w_3$ that is less than a width $w_4$ of the inner apertures 62. Both widths $w_3$ and $w_4$ are greater than the width $w_2$ of the legs 67, but less than the width $w_1$ of the backed portions 64. A single leg 67 of the unbacked portions 66 extends over each outer aperture 60, and two legs 67 of the unbacked portions 66 extend over each inner aperture 62. In the embodiment shown, the two legs 67 extending over each inner aperture 62 are components of adjacent traces 20a.

Figure 4A:
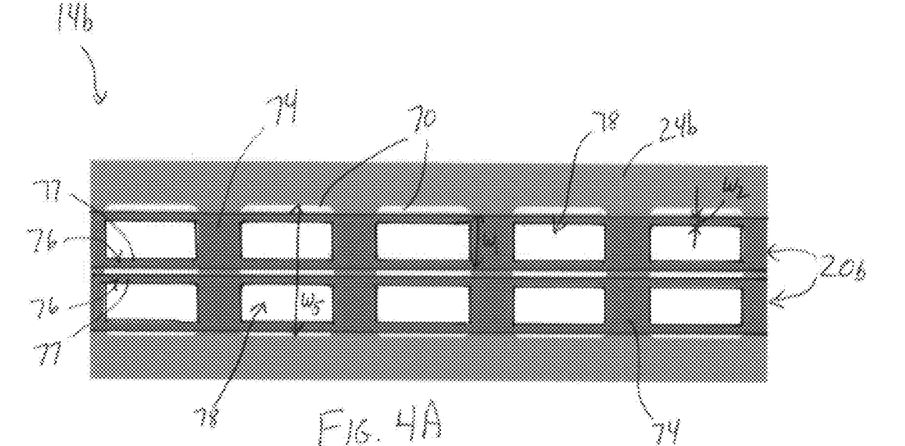
FIG. 4A is a top plan view of a portion of a lead flexure including a metal base layer with apertures extending across a width of the conductive traces, according to another embodiment of the present invention.
Figure 4B:
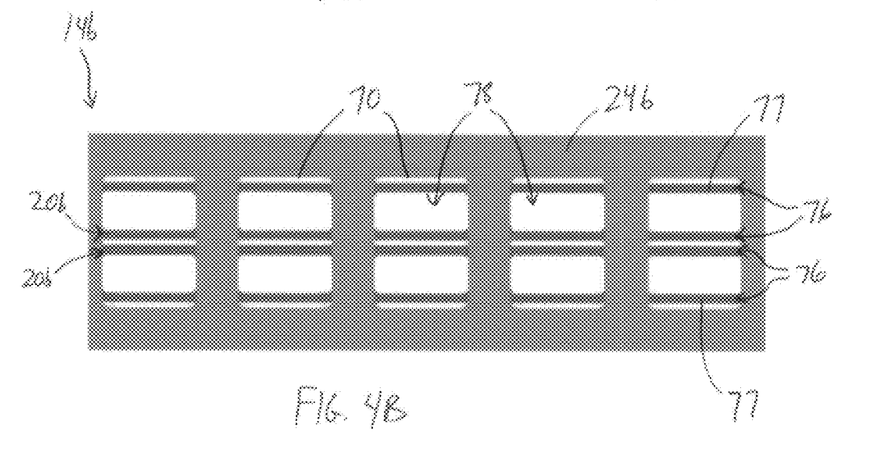
FIG. 4B is a bottom plan view of the portion of the lead flexure shown in FIG. 4A.

FIG. 4A is a top plan view and FIG. 4B is a bottom plan view of a portion of a flexure 14b including a spring metal layer 24b and conductive traces 20b, according to another embodiment of the present invention. The spring metal layer 24b includes apertures 70. The conductive traces 20b include backed portions 74 that extend over and are supported by the spring metal layer 24b. The conductive traces 20b also include unbacked portions 76 that extend over the apertures 70 and are unsupported by the spring metal layer 24b. The unbacked portions 76 define legs 77 that connect adjacent backed portions 74 at opposite ends of apertures 70. In the embodiment shown, adjacent backed portions 74 of each conductive lead 20b are connected by two legs 77 that extend from the outer edges or sides of the backed portions 74, which together define windows 78 through the conductive leads 20b. In alternative embodiments, the legs 77 can be at or extend from other parts of the backed portions 74.

The backed portions 74 and unbacked portions 76 of the traces 20b have dimensions substantially similar to the backed portions 64 and unbacked portions 66, respectively, described above with regard to traces 20a. In this embodiment, the aperture 70 has a width $w_5$ that is greater than the sum of the widths width $w_1$ of both of the traces 20b. The apertures 70 are sufficiently wide such that the legs 77 of both traces 20b extend over each aperture 70.

Figure 5A:
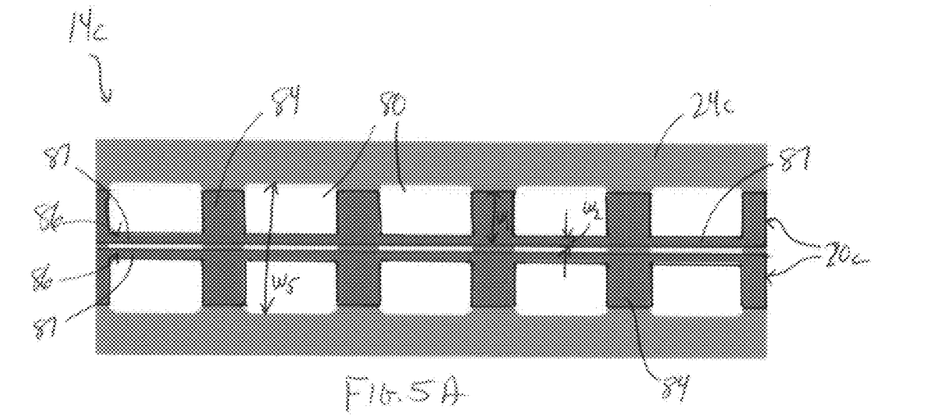
FIG. 5A is a top plan view of a portion of a lead flexure including a metal base layer with traces each having a single narrowed portion extending across apertures in the metal base layer, according to an embodiment of the present invention.
Figure 5B:
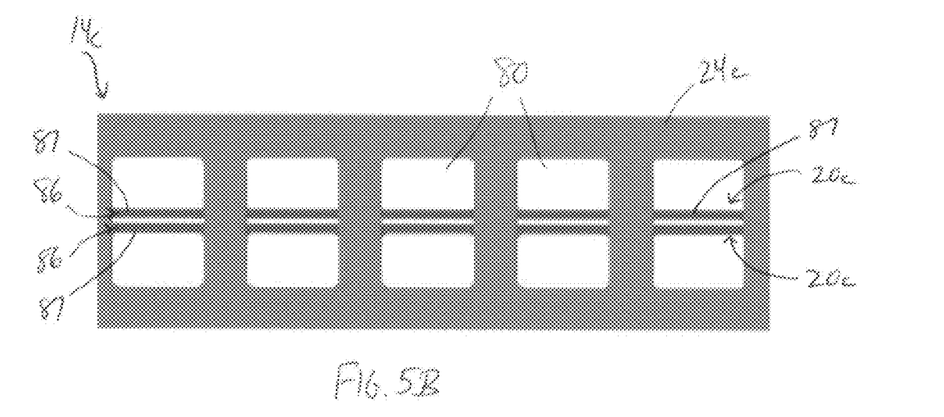
FIG. 5B is a bottom plan view of the portion of the lead flexure shown in FIG. 5A.

FIG. 5A is a top plan view and FIG. 5B is a bottom plan view of a portion of a flexure 14c including a spring metal layer 24c and conductive traces 20c, according to another embodiment of the present invention. The spring metal layer 24c includes apertures 80. The conductive traces 20c include backed portions 84 that extend over and are supported by the spring metal layer 24c. The conductive traces 20c also include unbacked portions 86 that extend over the apertures 80 and are unsupported by the spring metal layer 24c. The unbacked portions 86 define legs 87 that connect adjacent backed portions 84 at opposite ends of apertures 80. In the embodiment shown, adjacent backed portions 84 of each conductive lead 20c are connected by one leg 87.

The backed portions 84 and unbacked portions 86 of the traces 20c have dimensions substantially similar to the backed portions 64 and unbacked portions 66, respectively, described in FIGS. 3A and 3B with regard to traces 20a. In this embodiment, a single leg 87 extends from the outer edge or side of the backed portions 84, rather than two legs as in previous embodiments. In addition, the aperture 80 has a width $w_5$ (substantially similar to that of aperture 70 described above) that is greater than the sum of the widths $w_1$ of the backed portions 84 of both of the traces 20c. Legs 87 of both traces 20c extend over each aperture 80.

Figure 6A:
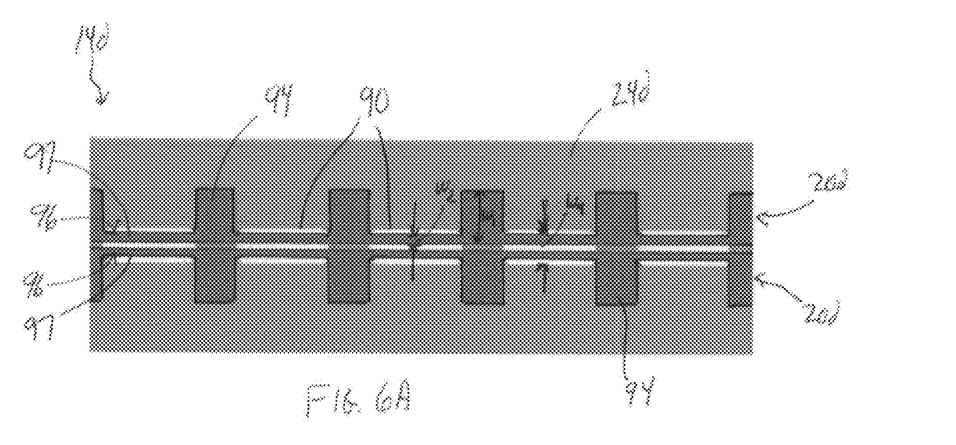
FIG. 6A is a top plan view of a portion of a lead flexure including a metal base layer with narrowed portions of the adjacent conductive traces extending across the same aperture in the metal base layer, according to an embodiment of the present invention.
Figure 6B:
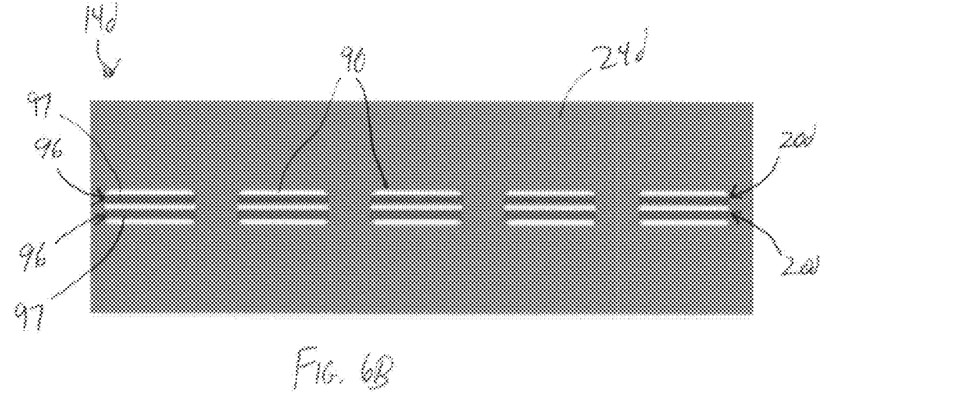
FIG. 6B is a bottom plan view of the portion of the lead flexure shown in FIG. 6A.

FIG. 6A is a top plan view and FIG. 6B is a bottom plan view of a portion of a flexure 14d including a spring metal layer 24d and conductive traces 20d, according to another embodiment of the present invention. The spring metal layer 24d includes apertures 90. The conductive traces 20d include backed portions 94 that extend over and are supported by the spring metal layer 24d. The conductive traces 20d also include unbacked portions 96 that extend over the apertures 90 and are unsupported by the spring metal layer 24d. The unbacked portions 96 define legs 97 that connect adjacent backed portions 94 at opposite ends of apertures 90. In the embodiment shown, adjacent backed portions 94 of each conductive lead 20d are connected by one leg 97.

The backed portions 94 and unbacked portions 96 of the traces 20d have dimensions substantially similar to the backed portions 64 and unbacked portions 66, respectively, described in FIGS. 3A and 3B with regard to traces 20a. In addition, the aperture 90 has a width $w_4$ (substantially similar to that of inner aperture 62 described above with regard to FIGS. 3A and 3B) that is greater than the width $w_2$ of the legs 97, but less than the width $w_1$ of the backed portions 94. Legs 97 of both traces 20d extend over each aperture 90. Thus, in this embodiment, the traces 20d are configured substantially similarly to traces 20c in FIGS. 5A and 5B, but the apertures 90 are narrower than apertures 80.

It will be appreciated that, for any of the embodiments described, variations on the configuration of flexure 14 shown may be made without departing from the present invention. For example, while two conductive traces 20 are shown in each embodiment, the flexure 14 may include any number of traces 20 extending in parallel or interleaved along the length of the flexure 14. In addition, the flexure 14 may include other traces not specifically shown that include traces 20 without narrowed portions and/or that do not extend over apertures formed in the spring metal layer 24. For example, the traces 20 shown may be configured to carry high current or high frequency signals, while other, non-windowed traces may be configured to carry lower current/frequency signals. Furthermore, the size and shape of the unbacked portions may be varied to satisfy design considerations of the flexure 14.

In summary, the present invention relates to an integrated lead flexure having traces with windowed or reduced width portions. In some embodiments, the flexure includes a metal base layer with a plurality of apertures, an insulating layer on the metal base layer, and one or more conductive traces formed on the insulating layer and extending over the metal base layer and the plurality of apertures. Backed portions of the one or more conductive traces that extend over the metal base layer have a first width, and unbacked portions of the one or more conductive traces that extend over the plurality of apertures have a second width that is less than the first width. The amount of material used in the windowed or reduced width portions decreases the material used to make the traces. At the same time, the windowed or reduced width portions have minimal effect on the electrical performance characteristics (e.g., bandwidth and impedance) of the traces.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. An integrated lead flexure comprising:
a metal base layer including a trace impedance compensating portion having a plurality of four or more adjacent apertures spaced along a longitudinal axis of the flexure, wherein the apertures of the impedance compensating portion are configured to control impedance of traces extending over the trace impedance compensating portion of the base layer;
an insulating layer on the metal base layer; and
one or more conductive traces formed on the insulating layer and extending over the metal base layer and the plurality of apertures, wherein backed portions of the one or more conductive traces that extend over and are supported by the metal base layer have a first width, and wherein unbacked portions of the one or more conductive traces that extend over the plurality of apertures and are unsupported by the metal base layer have a second width that is less than the first width, and wherein the unbacked portions of the traces that have the second width have relatively minimal effect on electrical performance characteristics of the traces over the trace impedance compensating portion.

2. The integrated lead flexure of claim 1, wherein the unbacked portions of the one or more conductive traces each include one or more legs connecting adjacent backed portions of the one or more conductive traces.

3. The integrated lead flexure of claim 2, wherein the one or more legs comprises a single leg.

4. The integrated lead flexure of claim 3, wherein the single leg extends from a side of the adjacent backed portions.

5. The integrated lead flexure of claim 2, wherein the one or more legs includes two legs, and wherein the two legs and adjacent backed portions connected by the two legs define a window through the one or more conductive traces.

6. The integrated lead flexure of claim 5, wherein the two legs extend from opposite sides of the adjacent backed portions.

7. The integrated lead flexure of claim 2, wherein two or more legs extend over at least some of the plurality of apertures.

8. The integrated lead flexure of claim 1, wherein a width of each of the plurality of apertures is greater than a sum of the first widths of the backed portions of the one or more conductive traces.

9. The integrated lead flexure of claim 1, wherein a width of each of the plurality of apertures is greater than the second width and less than the first width.

10. The integrated lead flexure of claim 1, wherein the one or more conductive traces comprises gold or silver.

11. An integrated lead flexure comprising:
a metal base layer including a trace impedance compensating portion having a plurality of four or more adjacent apertures, wherein the apertures of the impedance compensating portion are configured to control impedance of traces extending over the impedance compensating portion of the base layer;
an insulating layer on the metal base layer;
a plurality of terminal connector pads;
a plurality of head connector pads;
one or more conductive traces configured to carry current between the terminal connector pads and the head connector pads, the one or more conductive traces being formed on the insulating layer and extending over the metal base layer and the plurality of apertures, wherein backed portions of the one or more conductive traces that extend over and are supported by the metal base layer have a first width, and wherein unbacked portions of the one or more conductive traces that extend over the plurality of apertures and are unsupported by the metal base layer have a second width that is less than the first width, and wherein the unbacked portions of the traces that have the second width have relatively minimal effect on electrical performance characteristics of the traces over the trace impedance compensating portion.

12. The integrated lead flexure of claim 11, wherein the unbacked portions of the one or more conductive traces each include one or more legs connecting adjacent backed portions of the one or more conductive traces, and wherein each leg has a width less than the first width of the backed portions.

13. The integrated lead flexure of claim 12, wherein the one or more legs includes a single leg.

14. The integrated lead flexure of claim 12, wherein the one or more legs includes two legs, and wherein the two legs and adjacent backed portions connected by the two legs define a window through the one or more conductive traces.

15. The integrated lead flexure of claim 12, wherein two or more legs extend over at least some of the plurality of apertures.

16. The integrated lead flexure of claim 11, wherein a width of each of the plurality of apertures is greater than a sum of the first widths of the backed portions of the one or more conductive traces.

17. The integrated lead flexure of claim 11, wherein a width of each of the plurality of apertures is greater than the first width and less than the second width.

18. An integrated lead flexure including a metal base layer, an insulating layer on the metal base layer, and one or more conductive traces formed on the insulating layer, wherein the metal base layer includes a trace impedance compensating portion having a plurality of four or more apertures, wherein the apertures are configured to control impedance of traces extending over the impedance compensation portion, and wherein portions of the one or more conductive traces that extend over the plurality of apertures and are unsupported by the metal base layer have a width that is less than a width of portions of the one or more conductive traces that are supported by the metal base layer and do not extend over the plurality of apertures, and wherein the unbacked portions of the traces that have the second width have relatively minimal effect on electrical performance characteristics of the traces over the trace impedance compensating portion.

19. The integrated lead flexure of claim 18, wherein unsupported portions of the one or more conductive traces each include one or more legs connecting adjacent supported portions of the one or more conductive traces.

20. The integrated lead flexure of claim 19, wherein the one or more legs includes two legs, and wherein the two legs and adjacent supported portions connected by the two legs define a window through the one or more conductive traces.

21. The integrated lead flexure of claim 19, wherein two or more legs extend over at least some of the plurality of apertures.

22. The integrated lead flexure of claim 18, wherein a width of each of the plurality of apertures is greater than a sum of the widths of the portions of the one or more conductive traces that do not extend over the apertures.

23. The integrated lead flexure of claim 18, wherein a width of each of the plurality of apertures is greater than the width of the portions of the one or more conductive leads that extend over the apertures and less than a width of the portions of the one or more conductive traces that do not extend over the apertures.

24. The integrated lead flexure of claim 1 wherein the traces over the trace impedance compensating portion are free from portions having widths greater than the first width.

25. The integrated lead flexure of claim 11 wherein the traces over the trace impedance compensating portion are free from portions having widths greater than the first width.

26. The integrated lead flexure of claim 18 wherein the traces over the trace impedance compensating portion are free from portions having widths greater than the first width.

* * * * *